United States Patent [19]

Hach

[11] 3,905,768

[45] Sept. 16, 1975

[54] DISPOSABLE WEIGHT BURETTE AND METHOD FOR CARRYING OUT TITRIMETRIC ANALYSES

[75] Inventor: Clifford C. Hach, Ames, Iowa

[73] Assignee: Hach Chemical Company, Ames, Iowa

[22] Filed: Aug. 29, 1972

[21] Appl. No.: 284,655

[52] U.S. Cl............... 23/230 R; 23/253 R; 23/259; 23/292; 206/84; 222/212
[51] Int. Cl.² ................. G01N 31/16; G01N 31/18; G01L 3/02; B65D 37/000
[58] Field of Search....... 23/230 R, 253 R, 259, 292; 73/425.4 P, 425.6; 206/84; 222/158, 212, 215, 541

[56] References Cited
UNITED STATES PATENTS

| | | | |
|---|---|---|---|
| 1,358,950 | 11/1920 | Heath............................ | 23/230 R X |
| 3,045,494 | 7/1962 | Gerarde............................ | 73/425.6 |
| 3,204,835 | 9/1965 | Michel............................ | 222/541 |
| 3,215,299 | 11/1965 | Coanda et al............... | 222/158 UX |
| 3,522,077 | 7/1970 | Kaczmarek.......................... | 206/84 |
| 3,676,076 | 7/1972 | Grady.................................. | 23/292 |

OTHER PUBLICATIONS

Clowes and Coleman, "Quantitative Analysis," 4th ed., J. & A. Churchill, Publ., London, 1897, pp. 182–183.
Wilson et al., ed., "Comprehensive Analytical Chemistry," Vol. IA, Classical Analysis, Elsevier Publ. Co., N.Y., 1959, pp. 131–132.

Primary Examiner—Joseph Scovronek
Assistant Examiner—Barry I. Hollander
Attorney, Agent, or Firm—Wolfe, Hubbard, Leydig, Voit & Osann, Ltd.

[57] ABSTRACT

A disposable weight burette for use in carrying out a titrimetric analysis to quantitatively determine the presence of an unknown includes a flexible, impermeable capsule having an orifice of specified size, the capsule containing a titrant with a known weight standardization equivalent for the unknown. The titrimetric analysis is carried out by weighing the disposable weight burette, expressing sufficient titrant from the capsule into a sample solution of known volume and containing the unknown to reach the titration endpoint, reweighing the disposable weight burette and determining the quantitative presence of the unknown by comparing the weight of the titrant used to the weight standardization equivalent for the unknown and the quantity of sample taken for the analysis.

10 Claims, 6 Drawing Figures

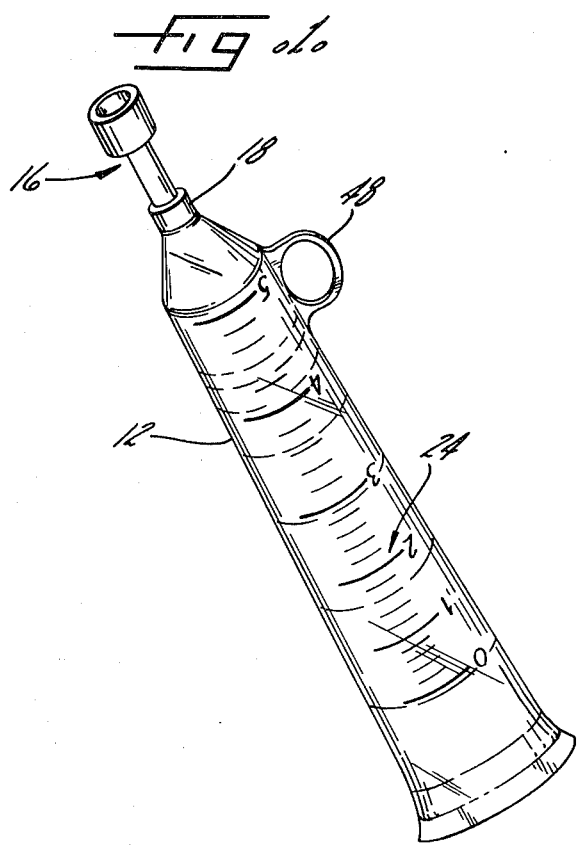
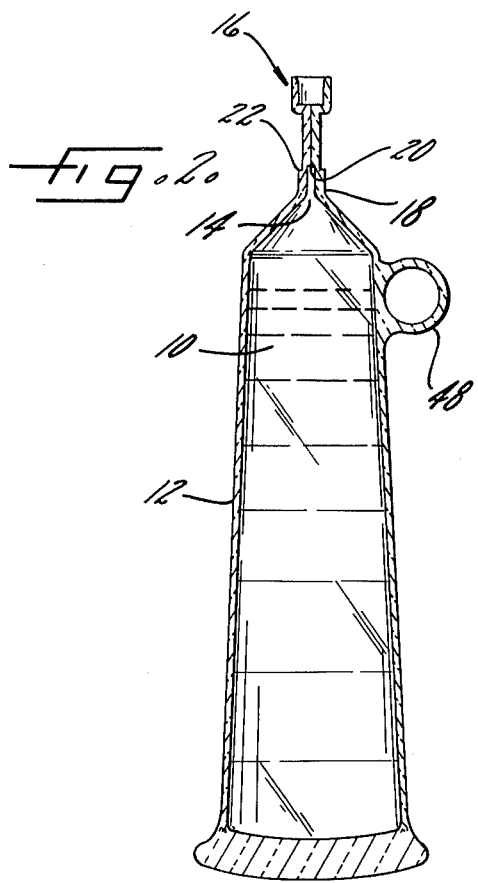
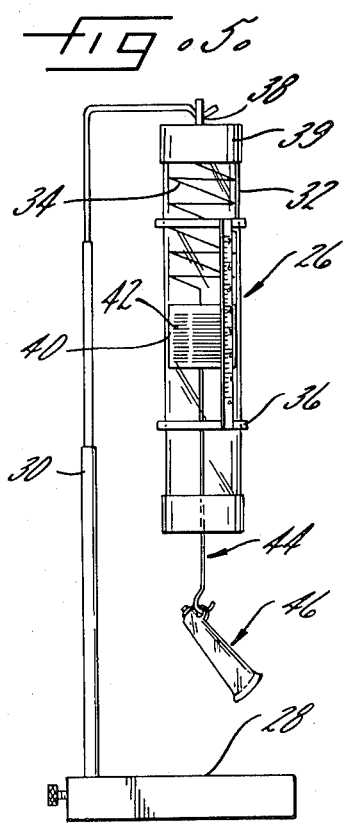
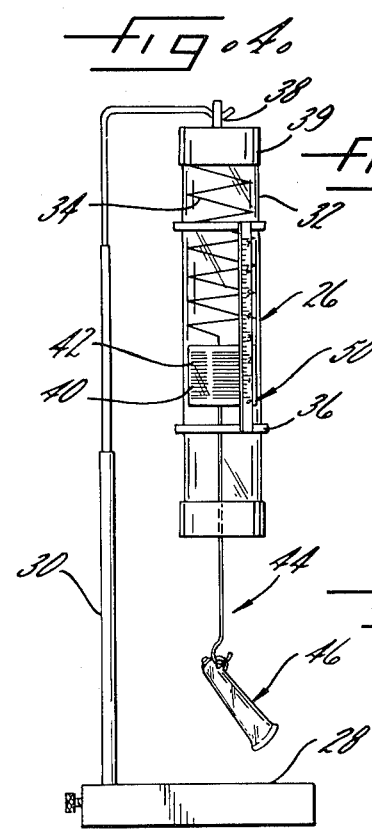
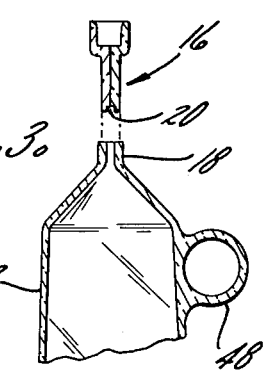
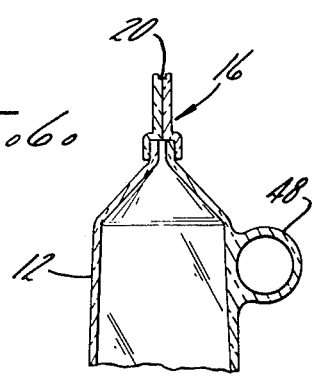

DISPOSABLE WEIGHT BURETTE AND METHOD FOR CARRYING OUT TITRIMETRIC ANALYSES

This invention relates to titrimetric analyses and, more particularly, to a disposable weight burette for use in such analyses and to titrimetric methods utilizing such disposable weight burettes.

Titrimetric analyses are an integral part of conventional analytical laboratory techniques for a wide variety of purposes. As one example, in water analysis, a conventional titrimetric analysis involves the determination of the hardness of water. This is typically carried out by using a disodium dihydrogen ethylene diamine tetraacetate titrant (viz. - EDTA) with an indicator such as the dye chrome black T and a sample solution buffered, as with an ammonium chloride-ammonium hydroxide solution, to provide a pH of about 10. The titrant is added until the endpoint is reached, indicated by a change in the solution color from a wine red to blue. Typically, the titrant is contained in a conventional glass burette with the sample solution, indicator and buffer being contained in a vessel such as a beaker or the like.

The hardness is generally reported in parts per million of calcium carbonate, i.e. — mgs. of $CaCO_3$ per liter of the sample solution. Typically, a standard hardness solution is prepared; and the concentration of the EDTA solution, serving as the titrant is adjusted so that there is a known relationship between the volume of titrant and the weight of $CaCO_3$ in milligrams. This relationship is generally selected to simplify the calculation of the hardness in the sample, e.g. — 1 mg. $CaCO_3$/1 ml. EDTA titrant. Hardness may then be calculated by the following formula: Hardness as mg./1 $CaCO_3$ (viz. - p.p.m.)= ml. of EDTA titrant used $\times$ 1000 $\times f \div$ ml. of sample taken ($f$ = 1 mg. $CaCO_3$/1 ml. EDTA example as herein described).

While this technique is sufficiently accurate, the apparatus used is fragile and bulky and troublesome to use in the field and in remote areas of the world. The titrants are supplied in bulk quantities, such as quart or gallon bottles, which are expensive to transport great distances, are subject to evaporation, contamination and deterioration.

It is accordingly an object of the present invention to provide a weight burette for use in carrying out titrimetric analyses which is characterized by its compactness, lightness in weight and ability to being shipped or otherwise transported with no danger of breakage.

Another object lies in the provision of a weight burette designed for disposal after a relatively few number of titrations.

A further object is to provide a weight burette designed for usage with a specific titrimetric analysis.

Yet another object of the present invention lies in the provision of a method for carrying out titricmetric analyses utilizing a disposal weight burette of the herein set forth type in a rapid, efficient manner yet which is fully as accurate as conventional techniques. A related object is to provide a method for carrying out titrimetric analyses which simplifies the procedure for the person conducting the analysis.

Still another, and more specific, object provides a method of conducting titrimetric analyses which allows the utilization of a laboratory gravimetric balance and achieves accuracy superior to that of conventional titrimetric analyses using a laboratory burette.

Other objects and advantages of the present invention will become apparent as the following description proceeds, taken in conjunction with the accompanying drawings, in which:

FIG. 1 is a perspective view of an exemplary embodiment of the weight burette of the present invention;

FIG. 2 is a cross-sectional view of the weight burette shown in FIG. 1 and showing the titrant contained therein;

FIG. 3 is a fragmentary cross-sectional view similar to FIG. 2 illustrating the weight burette with the closure removed and ready for use in carrying out a titrimetric analysis;

FIG. 4 is a schematic view and showing the weight burette (after the closure has been removed as illustrated in FIG. 3) being weighed on a spring balance, prior to initiating a titrimetric analysis;

FIG. 5 is a schematic view similar to FIG. 4, except showing the weight burette being reweighed after the titration has been completed; and FIG. 6 is a fragmentary cross-sectional view similar to FIG. 3 illustrating the weight burette after completion of the titration with a closure in place.

While the invention is susceptible of various modifications and alternative forms, certain specific embodiments thereof have been shown by way of example in the drawings which will be described in detail herein. It should be understood, however, that it is not intended to limit the invention to the particular form disclosed but, on the contrary, the intention is to cover all modifications, equivalents and alternatives falling within the spirit and scope of the invention. For example, while the invention is described in connection with the water analysis field and principally with respect to titrametric analyses for quantitatively determining hardness in a water sample, it should be certainly appreciated that the invention is equally applicable to use for any type of titrimetric analysis in any field. Similarly, while the illustrative embodiment shows the use of the weight burette with a specific spring balance and the description further includes an advantageous use in connection with highly accurate gravimetric balances, it should be understood that any means of weighing the burette could likewise be utilized.

Briefly, the present invention provides a weight burette for use in the quantitative analysis of an unknown which includes a titrant, having a known weight standardization equivalent for the unknown, enclosed in a capsule having an orifice of specified size. Prior to usage, the weight burette includes a closure to prevent premature discharge of the titrant. Desirably, the concentration of the titrant and the size of the capsule are such as to provide sufficient titrant for a specified number of analyses, after which the weight burette may be disposed of. The method of using the weight burette in accordance with the present invention and a detailed description of the burette itself will be described hereinafter.

Turning now to the drawings, FIGS. 1 and 2 illustrate an exemplary embodiment of the weight burette of the present invention prior to usage. The weight burette includes a titrant 10 enclosed in a capsule 12 having an orifice 14 and a closure, generally indicated at 16.

The capsule 12 may be formed of any material so long as it is inert with respect to the titrant enclosed, is sufficiently flexible so that the titrant can be expressed through the orifice 14 by squeezing the capsule and is sufficiently impermeable so that the burette may be stored for a reasonable length of time before there is any adverse effect on the titrant due to migration of moisture or the like. While not essential, it is desirable that the capsule be formed of a sufficiently translucent or transparent material to allow a visual determination of the titrant level contained therein. As representative examples, a regular grade of high density polyethylene, polypropylene, and polyvinyl chloride have been found to be suitable.

The overall size of the capsule 12 can be varied as desired; however, it has been found preferable from the standpoint of compactness to maintain a size sufficient to contain at least about five milliliters of titrant. The wall thickness of the capsule can also be varied as desired, consistent with the flexibility and impermeability requirements as hereinbefore described. In connection with polyethylene, a wall thickness of about 0.020 inch has been found to be suitable.

The particular titrant used is, of course, dependent upon the titrimetric analysis being conducted. In keeping with the present invention, the weight standardization equivalent (viz. - the weight of titrant required to titrate a known standard concentration of the unknown) of the unknown must be known so that the quantitative presence of the unknown in the sample being tested can be readily determined by a simple calculation from the weight of titrant required for the titration, the weight standardization equivalent of the unknown and the quantity of sample taken for analysis. The concentration of the titrant is desirably coordinated with the volume of titrant contained in the capsule and the expected level of the unknown so that at least one (and generally more) titrations can be carried out with one titration capsule.

In accordance with a further aspect of the present invention, the size of the orifice is maintained within specified limits so that the rate of flow is sufficiently restricted so that pressure exerted by squeezing does not result in the titrant being expressed at a difficultly controllable rate yet is sufficient to allow the titrant to be readily dispensed in a drop-wise fashion. To this end, the orifice should have a diameter of from about 0.01 to about 0.03 inch.

In accordance with yet another aspect of the present invention, the capsule is desirably formed with an integral closure, designed to be removed to expose the orifice when the weight burette is to be used. Prior to removal, the closure functions to prevent premature expression of the titrant solution. As shown in FIG. 1, a closure 16 is formed integrally with the extremity 18 of the capsule 12.

A further feature simplifies the separation of the closure from the capsule by increasing the area in which the separation can be made. To this end, and as is illustrated in FIGS. 2 and 3, the closure 16 is provided with an internal, closed cavity 20 sized complementally with the orifice 14 and positioned to form, with the orifice, a continuous passage. The closure can be separated from the capsule anywhere along the continuous passage with the assurance that there will be no blockage of the orifice.

To further simplify the separation of the closure from the capsule, a still further aspect of this invention desirably includes a means for locating the area at which the closure separation should be made. To this end, the outside dimension of the closure 16 merges with the capsule extremity 18 in such a fashion as to provide a shoulder, indicated at 22. The closure may then be readily separated from the capsule, when desired, by positioning a conventional set of clippers or the like against the shoulder and cutting. Since the cavity 20 forms a continuous passage with the orifice 14, separation of the closure 16 from the capsule 12 at the shoulder 22 avoids any possibility that the orifice would be wholly or partly blocked after the separation.

The capsule and integral closure may be formed by any suitable molding or other techniques, and the particular method of manufacture used is not critical to the present invention. It is, for example, suitable to form the weight burette by conventional injection molding techniques with an open end opposite the end of the capsule having the closure. This allows the proper amount of the titrant to be introduced into the capsule; and the capsule may be subsequently sealed as, for example, by well known heat-sealing procedures.

To carry out a titrimetric analysis using the weight burette of this invention, a measured sample containing the unknown can be added to a suitable vessel such as a beaker or the like and an indicator and, if necessary, a buffer, added thereto. The closure 16 may then be separated from the capsule as hereinbefore described, the capsule (filled with the appropriate titrant having the desired weight standardization equivalent of the unknown) weighed, the titration carried out to the endpoint, and the capsule reweighed. The quantitative presence of the unknown in the sample is then easily calculated from the weight of titrant employed in the titration, the weight standardization equivalent of the unknown and the quantity of the sample taken for analysis.

As an example, when determining the hardness of water, the concentration of the EDTA titrant used may suitably be adjusted so that 1 gram of the EDTA titrant will be equivalent to 10.00 mg. $CaCO_3$. If a 100 ml. water sample is taken for analysis, the hardness is then calculated by multiplying the weight of titrant used in grams by 100. Thus, if 1.5 grams of the EDTA titrant having the weight standardization equivalent for the unknown previously given (i.e. - 1 gm. EDTA titrant is equivalent to 10 mg. $CaCO_3$), the hardness level would be 150 p.p.m. (150 mg. $CaCO_3$/liter). The concentration of the EDTA titrant needed to provide the exemplary weight standardization equivalent can, of course, be readily determined by simple calculations, as is well known.

To further simplify the carrying out of the titrimetric analysis when the general level of titrant required for a particular sample is known, as would be the case after a single sample has been run, the present invention includes a volumetric indicia on the capsule. Thus, the capsule 12 has a volumetric indicia located on its outer surface as indicated at 24 (FIG. 1). While, of course, any volumetric measurement could be used, it has been found desirable to have the indicia corresponding to milliliters. Accordingly, if by a previous analysis, it has been determined that about 1 milliliter was needed to reach the titration endpoint, most of the titrant required may be rapidly squeezed out of the capsule and the remainder of the milliliter of titrant then slowly added as the endpoint is approached, thereby decreasing the time needed to carry out the titration.

While any means of weighing can be used, it has been found particularly desirable to employ a weighing device in accordance with the invention described in my copending application, entitled "Weight Loss Spring Balance". This allows the titrimetric analysis to be carried out with relative ease and with accuracy commensurate with that achieved from conventional techniques. In general, the spring balance of my copending application, indicated at 26 (FIG. 4) comprises a weighted base 28, an upstanding telescoping rod 30, an elongated, transparent tube 32 encasing a long coil spring 34 and a slidable scale 36 positioned about the tube. The telescoping rod 30 suspends the tube 32 via a pin 38, the upper end of the spring 34 being attached to an anchor plate (not shown) fixed between the cover cap 39 and the tube 12. Desirably, the base 28 holds the rod 30 via an adjustable tightening means such as a screw so that the support arm and base can be easily separated. It is also desirable to form the support arm of telescoping sections which may be collapsed when the spring balance is not being used.

The lower end of the spring 32 carries a block 40, which is complementally dimensioned with respect to the tube 32 so that there is no contact with the tube; and the block may move up and down without rubbing. Block 40 has a vernier scale 42 to provide accurate measurement in connection with the sliding scale 36. A strand and hook assembly 44 are connected to the bottom of the block 40 to hold the weight burette being weighed. The number of turns of the spring should be adjusted to provide a known relationship between its length of travel per unit weight. Preferably, to simplify calculations, the number of turns is adjusted to provide a travel of 1 inch for a weight of 1 gram.

In accordance with a further feature of the present invention, when used with the spring balance as herein described or any other weighing device requiring similar suspension, the weight burette (generally indicated at 46 in FIG. 4) is provided with a hanger means for allowing the burette to be readily and conveniently suspended on the weighing device. Desirably, and as is shown in the exemplary embodiment, the hanger means comprises an eyelet 48 integrally formed with the capsule 12 and positioned so that the orifice 14 will be facing in an upward fashion during the weighing operation. This avoids the possibility that titrant solution will be lost during weighing.

To carry out a titrimetric analysis in accordance with the method of the present invention and using the spring balance of my copending application, the weight burette first has the integral closure 16 removed, as by clipping, and is then placed on the strand and hook assembly 44 (FIG. 4) of the spring balance 26, via the eyelet 48. The slidable scale 36 is then moved so that its "0" reading is lined up with the vernier scale of the bobber, as indicated at 50. The disposable burette is then removed, the titrimetric anlaysis carried out as has been herein described and the weight burette reweighed, leaving the sliding scale in place. The weight difference is then read directly off the sliding scale and the vernier; and the amount of the unknown in the sample is calculated from the weight of titrant used, the weight standardization equivalent for the unknown and the quantity of sample taken for analysis as has been previously described.

While the use of the spring balance as herein discussed provides an advantageous means for weighing the weight burette in carrying out the method of titrimetric analysis in accordance with the present invention, any other conventional means of weighing can also be employed. Moreover, and in accordance with yet another aspect of the present invention, a highly accurate method of carrying out a titrimetric analysis can be achieved by employing a conventional gravimetric balance as the weighing means. Such balances are well known in the art and are capable of weighing, typically, to an accuracy of 1 part in 10,000. When balances of this type are used, the use of the disposable weight burette provides an extremely accurate method and achieves accuracy greater than can be obtained by using a standard burette.

Thus, as has been seen, the present invention provides a weight burette which may be used to carry out titrimetric analyses and disposed of after the titrant therein has been used up. The titrant contained in the capsule of the burette can be tailored to the particular analysis to be conducted and the level of the unknown being detected to minimize the preparation time required by the technician and to simplify the calculations involved. The invention also provides a ready method for carrying out titrametric analyses in a highly efficient and accurate fashion. By adjusting the pressure exerted on the flexible titration capsule, the expression of the titrant can be varied from a rapid flow to even a fraction of a drop. Indeed, when the titrant is being expressed in a drop-wise (or fraction thereof) fashion, release of the pressure will draw a drop exiting from the capsule orifice back into the capsule. In this manner, an extremely accurate endpoint can be reached. The particular weighing means used can be varied depending upon the accuracy required.

I claim as my invention:

1. A disposable weight burette for use in conducting a titrimetric analysis to quantitatively determine the presence of an unknown comprising a flexible, impermeable capsule terminating in a tapered nose portion having an orifice of from about 0.01 to about 0.03 inch in diameter, a titrant for the unknown contained within the capsule and having a known weight standardization equivalent for the unknown and a closure for the orifice integrally formed with the nose portion, said titrant being capable of being expressed through the orifice in dropwise fashion after removal of the closure by compressing the capsule.

2. The weight burette of claim 1 which includes a ring positioned adjacent its nose portion.

3. The disposable weight burette of claim 2 wherein said ring is integral with the capsule.

4. The disposable weight burette of claim 1 wherein a shoulder is provided between the nose portion and the closure.

5. The disposable weight burette of claim 1 wherein the closure contains an internal cavity complementally sized to the orifice and positioned to form a continuous passage with the orifice and terminating short of the external end of the closure.

6. The disposable weight burette of claim 1 wherein the closure includes a terminal portion having a cavity complementally shaped to the nose portion and adapted to fit over the nose portion.

7. The disposable weight burette of claim 1 wherein the capsule has volumetric indicia thereon.

8. The disposable weight burette of claim 1 wherein the capsule and closure are formed of plastic.

9. The disposable weight burette of claim 8 wherein the plastic is polyethylene.

10. A method of conducting a titrimetric analysis to quantitatively determine the presence of an unknown which comprises providing a sample solution of known volume containing the unknown, introducing an indicator for the analysis into the sample solution in an amount sufficient to allow the endpoint of the titrimetric analysis to be determined, providing a disposable weight burette including a flexible, impermeable capsule having an orifice of from about 0.01 to about 0.03 inch in diameter and a titrant for the unknown contained within the capsule and having a known weight standardization equivalent for the unknown and a unit weight of titrant, weighing the disposable weight burette, expressing sufficient titrant from the disposable weight burette into the sample solution to reach the endpoint, reweighing the disposable weight burette and quantitatively determining the amount of the unknown by comparing, in view of the volume of the sample solution, the weight of titrant used to reach the endpoint and the weight standardization equivalent for the unknown.

\* \* \* \* \*